United States Patent

[11] 3,621,411

[72] Inventor William R. Wisseman
Dallas, Tex.
[21] Appl. No. 876,485
[22] Filed Nov. 13, 1969
[45] Patented Nov. 16, 1971
[73] Assignee Texas Instruments Incorporated
Dallas, Tex.

[54] TRAVELING HIGH-GAIN AMPLIFIER
15 Claims, 5 Drawing Figs.

[52] U.S. Cl. ........ 330/5, 330/12
[51] Int. Cl. ........ H03f 3/04
[50] Field of Search ........ 330/5

[56] References Cited

UNITED STATES PATENTS

| | | | |
|---|---|---|---|
| 2,760,013 | 8/1956 | Peter | 330/5 |
| 3,350,656 | 10/1967 | Vural | 330/5 |
| 3,401,347 | 9/1968 | Sumi | 330/5 |
| 3,436,666 | 4/1969 | Clayton et al. | 330/5 |
| 3,464,020 | 8/1969 | Koyama et al. | 330/5 |

*Primary Examiner*—Roy Lake
*Assistant Examiner*—Darwin R. Hostetter
*Attorneys*—Samuel M. Mims, Jr., James O. Dixon, Andrew M. Hassell, Harold Levine, Melvin Sharp, John E. Vandigriff and William E. Hiller

ABSTRACT: Power amplification of a radiofrequency signal is achieved in a two-valley semiconductor material such a gallium arsenide (GaAs). To achieve amplification of the radiofrequency signal, a slow wave circuit, such as a meandering line is required to slow the propagating velocity of an electromagnetic wave in the two-valley semiconductor material below the velocity of the charge carriers. The slow wave circuit may be formed by printed circuit techniques on the surface of the semiconductor wafer. For high-gain amplification or self-oscillation, a DC or pulse source generates an electric field in the semiconductor so that the carriers drift in the direction of the radiofrequency wave propagation. The magnitude of the electric field applied to the semiconductor material is adjusted such that the rate of change of conductivity vanishes.

INVENTOR:
WILLIAM R. WISSEMAN

INVENTOR
WILLIAM R. WISSEMAN

TRAVELING HIGH-GAIN AMPLIFIER

This invention relates to a traveling wave high-gain amplifier, and more particularly to signal amplification in a two-valley semiconductor material.

Traveling wave amplification has been achieved by the interaction of a propagating electromagnetic wave and an electron beam in an evacuated glass envelope. In the usual manner of traveling wave amplification, an electron gun in an evacuated envelope emits electrons which are focused into a beam and passed through an RF interaction region. After delivering their DC energy to the RF field, the electrons are removed from the evacuated envelope by means of a collector electrode.

The velocity of propagation of the electromagnetic wave produced by the applied RF signal is slowed down to approximately the velocity of the electron beam by a slow wave circuit in the form of a helix. In the helical line, the electromagnetic wave travels along the wire with about the speed of light, but the velocity of propagation in the direction of the electron beam is somewhat less. The synchronism between the electromagnetic wave and the electrons results in a cumulative interaction which transfers energy from the electron beam to the RF wave, causing amplification of the radiofrequency signal.

Recently, there has been considerable interest in developing a semiconductor traveling wave amplifier (STWA) patterned after conventional electron beam traveling wave amplifiers. One attempt to produce such an amplifier has considered the use of a positive resistance semiconductor material, such as silicon. In an STW amplifier, the propagating RF electromagnetic wave interacts with drifting charge carriers instead of electrons as in the electron beam traveling wave amplifier.

In addition to the advantage of solid state reliability, a semiconductor traveling wave amplifier is also simpler to fabricate and has a more rugged construction. A semiconductor TW amplifier eliminates the need for a highly evacuated envelope.

An object of the present invention is to provide a semiconductor traveling wave amplifier. Another object of this invention is to provide a solid state traveling wave amplifier. A further object of this invention is to provide a solid-state traveling wave amplifier in a two-valley semiconductor material. Still another object of this invention is to provide a semiconductor traveling wave amplifier in a negative resistance material. Yet another object of this invention is to provide a high-gain semiconductor traveling wave amplifier.

In accordance with the present invention, a two-valley semiconductor wafer, such as GaAs, is biased into a region where the rate of change of conductivity vanishes. Biasing the semiconductor wafer to produce an electric field therein may be by means of a DC or pulse source. In contact with the two-valley semiconductor wafer is a circuit for producing an electromagnetic wave in the wafer that propagates at a velocity less than the drift velocity of the charge carriers. Connected to the circuit is a signal source that produces the electromagnetic wave; this wave propagates in the same direction as the carrier drift movement and interacts therewith. As in the case of the electron beam traveling wave amplifier, an interaction takes place whereby the charge carriers release energy to the electromagnetic wave as it travels through the two-valley semiconductor wafer.

A more complete understanding of the invention and its advantages will be apparent from the specification and claims and from the accompanying drawings illustrative of the invention.

Referring to the drawings.

Although not necessarily limited thereto, this description will proceed to describe a semiconductor traveling wave amplifier using gallium arsenide (GaAs) as the bulk semiconductor material. Other materials, such as many of the III–V semiconductor material, that exhibit negative resistance characteristics can be used.

Figure 1:
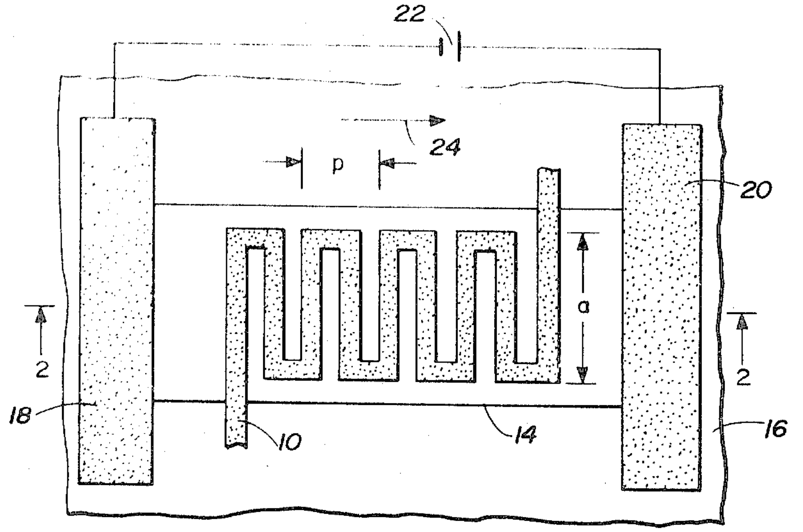
FIG. 1 is a schematic of a semiconductor traveling wave amplifier.
Figure 2:
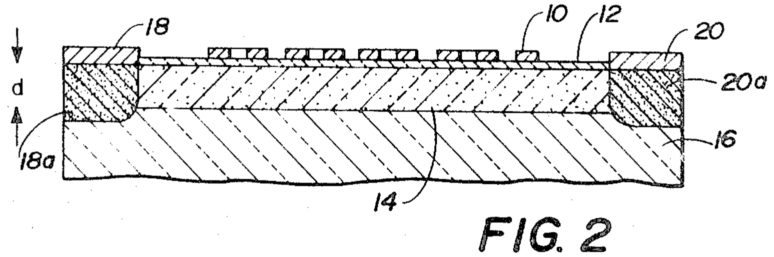
FIG. 2 is a sectional view of the amplifier illustrated in FIG. 1.

Referring to FIG. 1, there is shown a schematic of a semiconductor traveling wave amplifier using a meandering line as a slow wave circuit. It should be understood, however, that a meandering line slow wave circuit is but one example of many such circuits. Another slow wave circuit which is considered an equivalent of the meandering line is the interdigitated pattern.

The meandering line slow wave circuit 10 is fabricated in contact with an insulating layer 12 deposited over a relatively lightly doped semiconductor wafer 14. The insulating layer 12 may be formed by an evaporation process and the meandering line 10 by any one of several standard techniques, such as by photoresist masking and etching. Preferably, the semiconductor 14 is *n*-type GaAs with the insulating layer being an oxide, such as $SiO_2$. To add rigidity to the very fragile wafer 14, the wafer is mounted to a substrate material 16. When using an N-type GaAs wafer, the substrate is a semi-insulating GaAs.

To apply an electric field to the wafer 14, contacts 18 and 20 are formed at opposite ends of the active region (the wafer 14) of the amplifier over relatively heavy doped transition regions **18*a* and 20*a*, respectively. When using an N-type GaAs wafer, the regions 18*a* and 20*a* are $n^+$ GaAs grown into cavities etched into the wafer 14. These contacts may be designed to have a length wider than the active width of the wafer 14 to minimize contact effects. The contacts 18 and 20 along with the meandering line 10** may be gold.

Connected to the contacts 18 and 20 is a DC source 22. The source 22 produces an electric field in the wafer 14 at a biasing level determined by the desired circuit operation. Instead of a DC source, a pulse generator may also be used to establish the electric field across the wafer 14.

In operation, an Rf signal is applied to the meandering line 10 which propagates along the length of the path at approximately the speed of light. This RF signal produces an electromagnetic wave that propagates in the wafer 10 in a direction indicated by the arrow 24 at a velocity determined by the pitch ($p$) of the meandering line 10. The electromagnetic wave extends into the wafer 14 and reacts with drifting charge carriers of the GaAs. The direction and drift velocity of the charge carriers are determined by the voltage of the DC source 22. As a result of the interaction between the electromagnetic wave and the charge carriers, energy from the carriers is given up to the electromagnetic wave producing an amplification of the applied RF signal.

The interaction of the slow electromagnetic wave with the drifting carriers to produce amplification of the RF signal may best be understood by an analysis of the interaction using a two-valley model. It is felt such a model correctly describes the interaction of a semiconductor traveling wave amplifier.

By adding the effects of collisions and diffusion to the conventional theory of electron beam traveling wave amplifiers, Solymer and Ash, in a paper appearing in the *International Journal of Electronics*, Vol. 20, p. 127 (1966), treated the interaction of an electromagnetic wave and drifting carriers for positive resistance semiconductors, such as silicon. Using the theory of Solymer and Ash as a basis, the dispersion relation for the semiconductor traveling wave amplifier can be derived for semiconductors with a negative differential conductivity; using a two-valley model for the conduction bands. The dispersion relation is given by the expression:

$$(q^2-q_o^2)(\alpha-i\beta)=q_o q^2\omega\epsilon\omega^2_{p1}K_n A\left(1-\frac{r_1'v_1}{R}-\frac{i\omega}{R}\right) \qquad (1)$$

where $$\alpha=\omega^2_{p1}\left(1-\frac{r_1'v_1}{R}\right)+\frac{r_2\Gamma_1 D_1\omega^2}{Rv_\phi^2}\left(1-\frac{r_1'v_\phi}{r_2}\right)$$

$$-\omega^2\left[\left(1-\frac{v_1}{v_\phi}\right)\frac{\Gamma_1}{R}+1-\frac{2v_1}{v_\phi}+\frac{v_1 v_o}{v_\phi^2}\right]$$

$$\beta=\omega\Gamma_1\left(1-\frac{v_o}{v_\phi}\right)\left(1+\frac{r_1' v_1}{\Gamma_1}\right)+\frac{\omega}{R}\left[\frac{\omega^2{}_{p1}+\omega^2\Gamma_1 D_1}{v_\phi^2}-\omega^2\left(1-\frac{v_1}{v_\phi}\right)^2\right]$$

$R=r_1+r_2$, and $\Gamma_1=\gamma_1+r_1$

In the derivation of equation (1) for a two-valley model of a negative resistance semiconductor, the following is a list of the parameters:

$n_i$ = carrier density,
$\gamma_i$ = intravalley collision frequency,
$r_i$ = intravalley transfer rate,
$D_i$ = field dependent diffusion constant,
$\mu_i(v_i=\mu_i E_o)$ = carrier mobility, and
$\omega$
$(\omega^2{}_{pi}=n_i e^2/\epsilon m_i$ = plasma frequency.
$\epsilon$ = lattice dielectric constant
$m_i$ = carrier effective mass For a two-valley model, the subscript $i$ identifies a particular valley with a (1) denoting the central valley and a (2) the upper valley. From the above defined parameters, the carrier density in the wafer 14 is given by the expression: $n_o=n_i+n_2$, and $n_1 r_1=n_2 r_2$.

In calculating the dispersion relation given at (1), it was also assumed that the transfer rate from the central to the upper valley depends strongly on $v_1$. Based on this assumption, the intravalley transfer rate from the central valley to the upper valley, ($r_1$) is expanded in a Taylor's series about $v_1$ for a velocity perturbation $\delta v_1$ such that $r_1(v_1+\delta v_1)=r_1(v_1)+(dr_1/dv_{1v})\delta v_1$, where $r_1$ is set equal to $r_1(v_1)$ and $r_1'=(dr_1/dv_1)_{v_1}$. It was also assumed in the calculation of the dispersion relation that the intravalley collision frequency from the upper valley to the central valley, ($\gamma_2$), is much larger than other relevant frequencies, and $\mu_2$ and $D_2=0$ so that the average charge carrier velocity can be defined by the expression:

$$v_o=n_1 v_1/n_o. \quad (2)$$

Parameters in equation (1) which depend on the properties of the particular slow wave circuit 10 are the propagation coefficient of the unperturbed circuit wave ($q_o$), the propagation coefficient of the coupled wave $q(v\phi=\omega/q)$, the interaction impedance of the $n^{th}$space harmonic $K_n$, and the active area A.

An approximate solution to equation (1) can be made by taking $q=q_o+\delta$ and assuming the absolute value of $\delta$ is much less than the absolute value of $q_o$. Since gain is realized in the device of FIG. 1 only when the imaginary part of $\delta$ becomes negative, only the imaginary part of $\delta$ is of interest. From equation (1), the imaginary part of $\delta$ is given by:

$$Im\,\delta=\frac{\epsilon q_0^2 K_n A\omega F}{2} \quad (3)$$

where $F$ is defined as a gain factor and is defined by the expression:

$$F=\frac{\omega_{p1}^2\left[\left(1-\frac{r_1' v_1}{R}\right)\beta-\frac{\omega\alpha}{R}\right]}{\alpha^2+\beta^2} \quad (4)$$

Since all the quantities in the expression for imaginary $\delta$ are positive, the gain factor $F$ must be negative to realize gain. In the equation for the gain factor, the term $r_1' v_1$ may be defined by the expression:

$$r_1' v_1=\frac{-E_o\left(\frac{n_o r_2}{n_1^2}\right)\left(\frac{dn_1}{dE}\right)E_o}{1+\frac{E_o}{\mu_1}\left(\frac{d\mu_1}{dE}\right)E_o} \quad (5)$$

where $E_o$ is the value of the electric field in the wafer 14 as determined by the source 22 connected to the contacts 18 and 20. Using the above expression, it can also be shown that the term $(1-r_1' v_1/R)$ in the gain factor equation vanishes at a critical electric field, $E_{cl}$, where the static differential conductivity vanishes.

The value of the critical electric field varies for the different two-valley semiconductor materials available. For each material, the value of the critical electric field is determined from experimental data and a plot of carrier drift velocity versus applied electric field.

Figure 3:
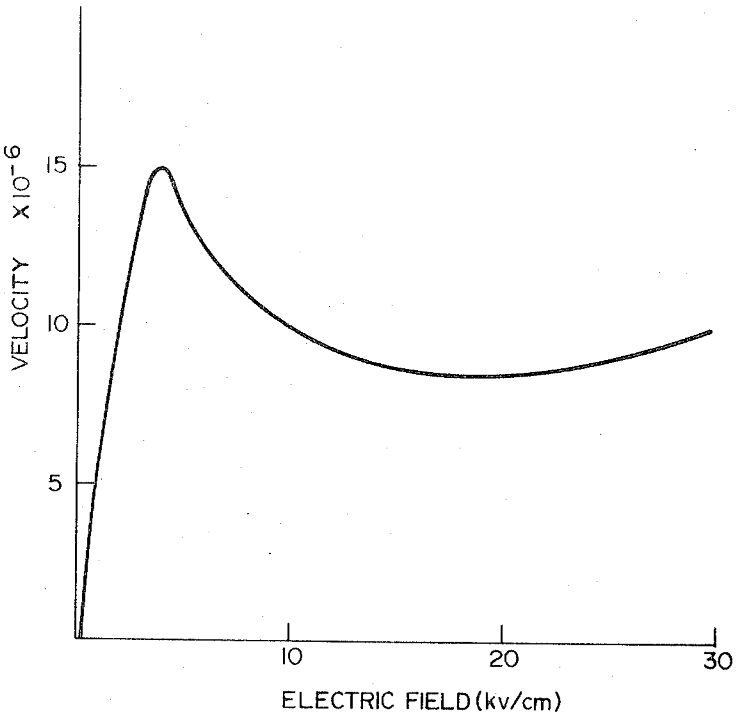
FIG. 3 is a plot of carrier velocity in centimeters per second versus electric field in kilovolts per centimeter.

Referring to FIG. 3, there is shown such a plot for GaAs. For N-type GaAs, the critical electric field at which the static differential conductivity vanishes, i.e., the differential of the curve is zero, is about 3.0 kv./cm.

At the critical electric field where the static differential conductivity vanishes, the term $r_1' v_1/R=1$ and the gain factor equation reduces to:

$$F=\frac{-\omega_{p1}^2\omega\alpha}{R(\alpha^2+\beta^2)} \quad (6)$$

which means that $\alpha$ must be positive electronic gain. Further, the condition that $v_\phi$ is less than or approximately equal to $v_o$ must also be satisfied to make the gain factor negative. The value of $v_\phi$ which leads to maximum gain is that which causes $\beta$ to go to 0.

A practical way to optimize the gain factor is to choose a carrier density $n_o$ and an electromagnetic wave propagating velocity $v_\phi$ to make $\beta=0$. Considering the expression previously given for $\beta$ and neglecting terms which are negligible, $\beta$ can be approximated by the expression:

$$\beta=\omega\Gamma_1\left(1-\frac{v_o}{v_\phi}\right)\left(1+\frac{r_1' v_1}{\Gamma_1}\right)+\frac{\omega\omega_{p1}^2}{R} \quad (7)$$

This expression can be simplified by making use of the equality $r_1' v_1=R$. Substituting this quantity into the expression at (7) gives:

$$\beta=\omega\Gamma_1\left(1-\frac{v_o}{v_\phi}\right)\left(1+\frac{R}{\Gamma_1}\right)+\frac{\omega\omega_{p1}^2}{R} \quad (8)$$

For $\beta$ equal zero requires that:

$$-\Gamma_1\left(1-\frac{v_o}{v_\phi}\right)\left(1+\frac{R}{\Gamma_1}\right)=\frac{\omega^2{}_{p1}}{R} \quad (9)$$

Note, that the frequency term cancels out in the above expression. This equation relates the optimum value of the electromagnetic wave propagation velocity, $v$ , to the total carrier density, $n_o$. It is compatible with the condition that $v$ is less than the carrier drift velocity, $v_o$, for a positive $\alpha$.

Figure 4:
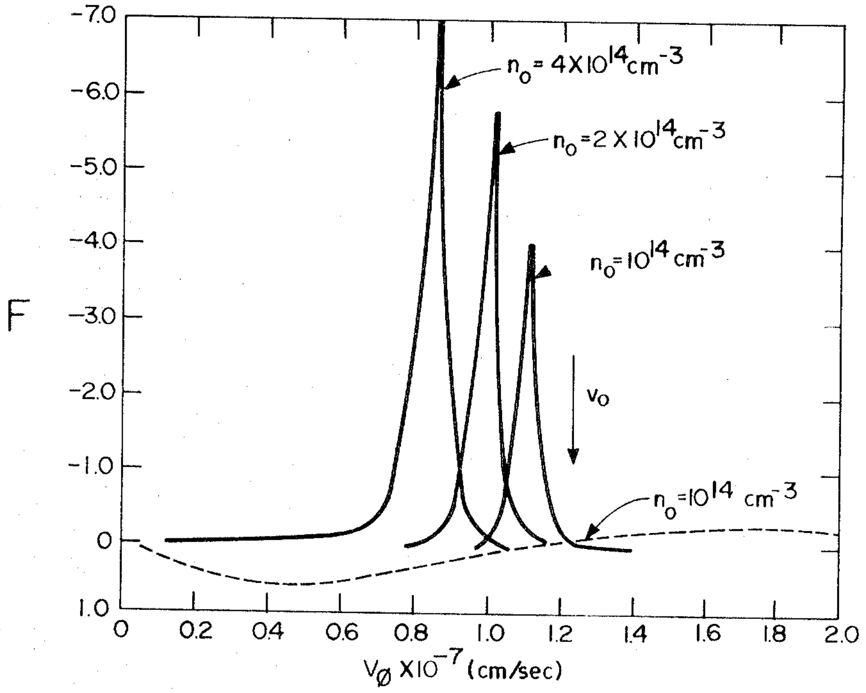
FIG. 4 is a plot of amplifier gain factor versus the velocity of a propagating electromagnetic wave in centimeters per second.

When the variable $v_\phi$ and $n_o$ are properly chosen to make $\beta=0$, the gain factor equation reduces to:

$$F=\frac{-\omega^2{}_{p1}\omega}{R\alpha} \quad (10)$$

where $\alpha$ is proportional to $\omega^2$ so that $F_{max}$ is proportional to $\omega^{'7E'1}$ Referring to FIG. 4, there is shown a plot of the gain factor $F$ as a function of $v_\phi$ for three values of $n_o$ at 4.0 GHz. and $E_o=E_{cl}$. For contrast, the gain factor is also plotted for $E_o$ greater than $E_{cl}$ for one value of $n_o$ (dashed curve). From the curve of FIG. 4, it can be seen that when $E_0=E_{cl}$ the gain factor $F$ depends critically on the values of $n_o$ and $v_\phi$.

Returning to a consideration of equation (3) it can be used to obtain an expression for the power gain per unit length, G, for a specific slow wave structure, neglecting certain losses. For the meandering line 10 of FIG. 1, it can be shown that G is proportional to $p^{'7E'1}$, where $p$ is the pitch of the meandering line.

Figure 5:
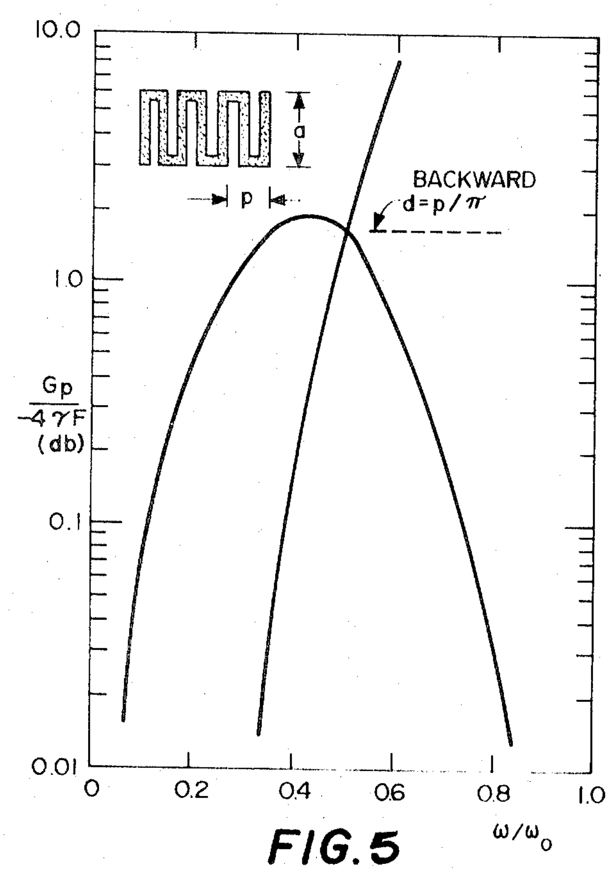
FIG. 5 is a plot of gain versus frequency normalized to a characteristic frequency.

Referring to FIG. 5, there is shown a plot of the quantity $-Gp/4\gamma F$ as a function of $\omega/\omega_o$ for the forward and backward space harmonics of a meandering line. The term $\omega_o$ is a characteristic frequency given by the expression:

$$\omega_0=\pi c/a\sqrt{\epsilon} \quad (11)$$

where $a$ is the width of the meandering line pattern, and $\gamma$ is a geometric factor which is approximately equal to one-half. Since the fields associated with the propagating electromagnetic slow wave decay by a factor $1/e$ in a distance $1/q_o$ from the meandering line 10, the expression $A=a/q_o$ is used in determining the active area of the wafer 14.

While preferred embodiments of the invention have been described in detail herein, and shown in the accompanying drawings, it will be evident that various further modifications will be apparent to those skilled in the art.

What is claimed is:

1. A semiconductor traveling wave high-gain amplifier comprising:
   - a two-valley semiconductor wafer,
   - a voltage source electrically connected to said wafer set to a value effective to bias said wafer into a region where the rate of change of conductivity is substantially zero, effecting charge carrier drift movement in a preferred direction, and
   - circuit means in contact with said semiconductor wafer for producing an electromagnetic wave therein, said electromagnetic wave propagating at a velocity less than the drift velocity of said charge carriers and interacting therewith, said carriers releasing energy to said electromagnetic wave as it travels through said semiconductor wafer.

2. A semiconductor traveling wave high-gain amplifier as set forth in claim 1 wherein the velocity of the propagating electromagnetic wave is adjusted to satisfy the expression:

$$-\Gamma_1\left(1-\frac{v_o}{v_\phi}\right)\left(1+\frac{R}{\Gamma_1}\right)=\frac{\omega^2_{p1}}{R}$$

3. A semiconductor traveling wave high-gain amplifier as set forth in claim 1 wherein the gain factor of the amplifier is given by the expression:

$$F=\frac{-\omega^2_{p1}\omega\alpha}{R(\alpha^2+\beta^2)}$$

4. A semiconductor traveling wave high-gain amplifier as set forth in claim 1 wherein the total charge carrier density of the semiconductor wafer and the velocity of the propagating electromagnetic wave are chosen such that the gain factor of said amplifier is given by the expression:

$$F=\frac{-\omega^2_{p1}\omega}{R\alpha}$$

5. A semiconductor traveling wave high-gain amplifier comprising:
   - a two-valley semiconductor wafer,
   - a voltage source electrically connected to said wafer set to a value effective to bias said wafer into a region where the rate of change of conductivity is substantially zero, effecting carrier drift movement in a preferred direction,
   - a meandering line in contact with said semiconductor wafer for producing an electromagnetic wave therein, said electromagnetic wave propagating at a velocity less than the drift velocity of said carriers and interacting therewith, said carriers releasing energy to said electromagnetic wave as it travels through said semiconductor wafer.

6. A semiconductor traveling wave high-gain amplifier as set forth in claim 5 wherein the value of the expression defining the characteristic frequency $(\omega_0=\pi c/a\sqrt{\epsilon})$ for a meandering line is chosen such the the normalized frequency $(\omega/\omega_o)$ is in the range of 0.3 to 0.6.

7. A semiconductor traveling wave high-gain amplifier as set forth in claim 6 wherein the velocity of the propagating electromagnetic wave is adjusted to satisfy the expression:

$$-\Gamma_1\left(1-\frac{v_o}{v_\phi}\right)\left(1+\frac{R}{\Gamma_1}\right)=\frac{\omega_{p1}^2}{R}$$

8. A semiconductor traveling wave high-gain amplifier as set forth in claim 6 wherein the pitch of the meandering line for a given line width is selected to adjust the propagating velocity of the electromagnetic wave to satisfy the expression:

$$-\Gamma_1\left(1-\frac{v_o}{v_\phi}\right)\left(1+\frac{R}{\Gamma_1}\right)=\frac{\omega_{p1}^2}{R}$$

9. A semiconductor traveling wave high-gain amplifier comprising:
   - an N-type GaAs semiconductor wafer,
   - a voltage source electrically connected to said wafer set to a value effective to bias said wafer into a region where the rate of change of conductivity is substantially zero, effecting carrier drift movement in a preferred direction,
   - a meandering line in contact with said GaAs wafer for producing an electromagnetic wave therein propagating at a velocity less than the drift velocity of said carriers for interaction therewith, said carriers releasing energy to the electromagnetic wave as it travels through said GaAs wafer.

10. A semiconductor traveling wave high-gain amplifier as set forth in claim 9 wherein the carrier density of said GaAs wafer and the velocity of the propagating electromagnetic wave are chosen such that the gain factor of said amplifier is given by the expression:

$$F=\frac{-\omega_{p1}^2\omega}{R\alpha}$$

11. A semiconductor traveling wave high-gain amplifier as set forth in claim 9 wherein the gain factor of the amplifier is given by the expression:

$$F=\frac{-\omega_{p1}^2\omega\alpha}{R(\alpha^2+\beta^2)}$$

12. A semiconductor traveling wave high-gain amplifier as set forth in claim 10 when said biasing means includes a DC source connected to said GaAs wafer.

13. A semiconductor traveling wave high-gain amplifier as set forth in claim 10 wherein said biasing means includes a pulse generator connected to said GaAs wafer.

14. A method for operating a semiconductor traveling wave high-gain amplifier comprising the steps of:
   - biasing a two-valley semiconductor wafer into the region where the rate of change of conductivity is substantially zero to effect charge carrier drift movement in a preferred direction,
   - generating an electromagnetic wave in said wafer, and
   - controlling the velocity of propagation of said electromagnetic wave to a value less than the drift velocity of said charge carriers, whereby said carriers release energy to said electromagnetic wave as it propagates through said semiconductor wafer.

15. A method for operating a semiconductor traveling wave high-gain amplifier as set forth in claim 14 wherein the velocity of propagation of said electromagnetic wave is controlled to satisfy the expression:

$$-\Gamma_1\left(1-\frac{v_o}{v_\phi}\right)\left(1+\frac{R}{\Gamma_1}\right)=\frac{\omega_{p1}^2}{R}$$

* * * * *